(12) United States Patent
Groleau et al.

(10) Patent No.: US 9,197,507 B2
(45) Date of Patent: Nov. 24, 2015

(54) AUTO-CONFIGURING MULTI-LAYER NETWORK

(71) Applicant: Schneider Electric Buildings, LLC, Palatine, IL (US)

(72) Inventors: Rejean Groleau, Montreal (CA); Simon Caron, Montreal (CA); Hami Monsarrat-Chanon, Montreal (CA)

(73) Assignee: Schneider Electric Buildings, LLC, Palatine, IL (US)

( * ) Notice: Subject to any disclaimer, the term of this patent is extended or adjusted under 35 U.S.C. 154(b) by 49 days.

(21) Appl. No.: 13/653,182

(22) Filed: Oct. 16, 2012

(65) Prior Publication Data

US 2013/0163472 A1 Jun. 27, 2013

Related U.S. Application Data

(63) Continuation of application No. 12/746,483, filed as application No. PCT/CA2008/002148 on Dec. 8, 2008, now abandoned.

(60) Provisional application No. 60/996,853, filed on Dec. 7, 2007.

(51) Int. Cl.
*H04L 12/24* (2006.01)
*H04L 29/08* (2006.01)
*H04L 12/26* (2006.01)

(52) U.S. Cl.
CPC ........ H04L 41/0836 (2013.01); H04L 41/0806 (2013.01); H04L 41/0886 (2013.01); H04L 67/12 (2013.01); *H04L 43/10* (2013.01)

(58) Field of Classification Search
CPC .................................................. H04L 41/0846
USPC ........................................ 370/255, 390, 256
See application file for complete search history.

(56) References Cited

U.S. PATENT DOCUMENTS

| | | | |
|---|---|---|---|
| 5,506,838 A * | 4/1996 | Flanagan | 370/258 |
| 6,832,249 B2 | 12/2004 | Yeager et al. | |
| 6,894,985 B2 * | 5/2005 | Billhartz | 370/252 |
| 6,937,600 B2 | 8/2005 | Takagi | |
| 6,948,044 B1 | 9/2005 | Chandrasekaran | |
| 6,975,645 B1 | 12/2005 | Suzuki et al. | |
| 7,082,131 B2 * | 7/2006 | Yamauchi et al. | 370/390 |
| 7,130,728 B2 | 10/2006 | Suzuki | |
| 7,197,030 B2 * | 3/2007 | Witchalls | 370/356 |
| 7,290,168 B1 * | 10/2007 | DeKoning | 714/5.11 |
| 7,293,154 B1 * | 11/2007 | Karr et al. | 711/202 |

(Continued)

OTHER PUBLICATIONS

International Search Report on Patentability dated Jun. 8, 2010 for International Application No. PCT/CA2008/002148.

(Continued)

*Primary Examiner* — Rasheed Gidado
(74) *Attorney, Agent, or Firm* — N W Poulsen; A M Seralathan

(57) ABSTRACT

An auto-configuring multi-layer network including different communication protocols, namely both wired and wireless protocols, interchangeably and indifferently to interconnect various devices such as, for example, controllers, actuators, alarms, sensors, interfaces, etc. The auto-configuring multi-layer network uses a virtualization functionality that mirrors devices from one layer having a given communication protocol unto another layer having a different communication protocol.

40 Claims, 13 Drawing Sheets

(56) References Cited

U.S. PATENT DOCUMENTS

| | | | |
|---|---|---|---|
| 7,480,780 B2* | 1/2009 | Kitamura | 711/165 |
| 7,684,438 B2* | 3/2010 | Stephens et al. | 370/466 |
| 7,869,351 B2* | 1/2011 | Ward et al. | 370/228 |
| 7,962,647 B2 | 6/2011 | Suri et al. | |
| 8,046,446 B1 | 10/2011 | Karr et al. | |
| 8,145,790 B2* | 3/2012 | Thomas | 709/245 |
| 2003/0179756 A1* | 9/2003 | Cain | 370/395.42 |
| 2004/0008691 A1* | 1/2004 | Winter et al. | 370/395.31 |
| 2004/0203797 A1* | 10/2004 | Burr | 455/445 |
| 2004/0205175 A1* | 10/2004 | Kammerer | 709/223 |
| 2004/0210673 A1 | 10/2004 | Cruciani et al. | |
| 2005/0207444 A1 | 9/2005 | Zimmerman et al. | |
| 2005/0228937 A1* | 10/2005 | Karr et al. | 711/6 |
| 2010/0014444 A1* | 1/2010 | Ghanadan et al. | 370/310 |

OTHER PUBLICATIONS

Written Opinion of the International Searching Authority dated Mar. 23, 2009 for International Application No. PCT/CA2008/002148.

* cited by examiner

AUTO-CONFIGURING MULTI-LAYER NETWORK

CLAIM FOR PRIORITY

This application is a Continuation of, and claims priority under 35 U.S.C. §120 to U.S. patent application Ser. No. 12/746,483, filed Jan. 18, 2011, which in turn is a National Stage Entry entitled to and hereby claiming priority under 35 U.S.C. §§365 and 371 to corresponding PCT application No. PCT/CA2008/002148, filed Dec. 8, 2008, which in turn claims priority to US. Provisional Application Serial No. 60/996,853, filed Dec. 7, 2007. The entire contents of the aforementioned applications are herein expressly incorporated by reference.

TECHNICAL FIELD

The present invention relates to an auto-configuring multi-layer network.

BACKGROUND

Bridges have commonly been used to allow two networks to communicate with each other. These networks might be the same type of network, like two wired networks, or different networks, like a wired network and wireless network.

In order to achieve both wired broadcast and wireless mesh communication in a network, an option is to have a redundant (or parallel) setup with a wired network and a wireless network both communicating with every node.

In this setup, a "redundancy server" can communicate with any node either through the wired or wireless network. If one of the two networks fails, for example the wired network, the redundancy server can still communicate through the other network, i.e. the wireless network, but the "failed" network will be down for all of the nodes.

However, no solution up to date solution enables the use of an autonomous wired sub-network within a wireless environment.

SUMMARY

To overcome the above-mentioned problems of the prior realizations, the present invention is concerned with an auto-configuring multi-layer network.

According to an illustrative example of the present invention, there is provided a method for auto-configuring a multi-layer network including at least two layers using different communication protocols to interchangeably interconnect at least two nodes, the method comprising:
providing each node withy an information packet including:
a unique identifier;
a function identifier;
a link quality; and
a time to live counter;
for each node, broadcasting at defined intervals a heartbeat packet including:
an indicator that the packet is a heartbeat packet;
a layer node identifier specific identifying the broadcasting node within a given layer; and
the information packet of the broadcasting node;
identifying nodes connected to at least a first layer and a second layer of the at least two layers as virtualizer nodes;
for each virtualizer node:
a) mirroring nodes observed by the virtualizer node on the first layer onto the second layer, including assigning each first layer node a layer node identifier on the second layer; and
b) mirrors nodes observed by the virtualizer node on the second layer onto the first layer, including assigning each second layer node a layer node identifier on the first layer;
for each node, building a registry comprising an entry for each node from which a heartbeat is received, the registry entry including:
the unique identifier of the node from which a heartbeat is received; and
the layer node identifiers of the node from which a heartbeat is received;
wherein a source node selects a layer to communicate with a destination node based on the source node registry.

According to an illustrative example of the present invention, there is provided a method for auto-configuring a multi-layer network including at least two layers using different communication protocols to interchangeably interconnect at least two nodes, further comprising:
triggering the broadcasting of a locator packet of the source node to establish a collaboration with at least one desired collaboration node, the source node locator packet including:
an indicator that the packet is a locator packet; and
the information packet of the source node;
triggering the broadcasting of a locator packet of the at least one desired collaboration node within a localization period associated with the source node, each desired collaboration node locator packet including:
an indicator that the packet is a locator packet; and
the information packet of the desired collaboration node;
initiating the collaboration between the source node and the at least one desired collaboration node on the basis of their respective functional identifiers; and
broadcasting that the collaboration between the source node and the at least one desired collaboration node was successfully initiated until a collaboration broadcasting period expires.

The foregoing and other objects, advantages and features of the present invention will become more apparent upon reading of the following non-restrictive description of illustrative embodiments.

BRIEF DESCRIPTION OF THE DRAWINGS

Non-limitative illustrative embodiments of the invention will now be described by way of example only with reference to the accompanying drawings, in which.

DETAILED DESCRIPTION

Generally stated, the non-limitative illustrative embodiment of the present invention provides an auto-configuring multi-layer network including different communication protocols, namely both wired and wireless protocols, interchangeably and indifferently to interconnect various devices such as, for example, controllers, actuators, alarms, sensors, interfaces, etc.

In the forgoing description, for clarity and conciseness purposes, reference will be made to a list of terms which will now be defined.

Node: is meant to encompass any device participating in network activities such as a controller, actuator, alarm, sensor, interface, etc.

ComLayer: the communication layer is meant to encompass any communication link or sub-network (hardware/software), wired or wireless, which provides the following functionalities:

a sender node can send data to all nodes on the network (broadcasting);

a sender node of a data packet is known or can be known by the receiver node;

each node is addressable;

any node can communicate with any node (point to point); and any node can change ID on the network.

Examples of protocols that can be used are: CANbus/CANopen, ZigBee, TCP/IP, UDP/IP, etc.

ComLayerID: the communication layer ID is a layer node identifier which is specific to a ComLayer, e.g. for CANbus/CANopen it is the 7 bits or 29 bits node identifier while for TCP/IP it is the IP address of a node.

Packet: is a group of data, which may contain sub-packets.

Multi-layer: which involves a plurality of ComLayers.

Figure 1:
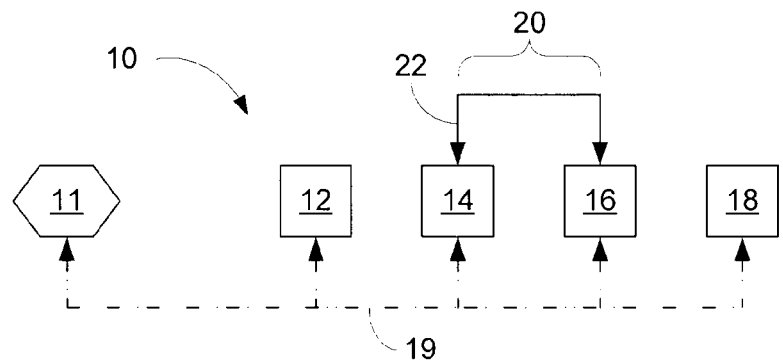
FIG. 1 is a schematic view of an example of an autonomous wired sub-network within a wireless network.

Referring to FIG. 1, there is shown an example an autonomous wired sub-network 20 within a wireless network 10. In such a setup, communication between the wired nodes 14 and 16 would be maintained through the wired connection 22 even if wireless communication link 19 is down, while nodes 11, 12 and 18 would loose communication.

The existence of a wired sub-network is essential in any situation where communication between some of the nodes is critical, both for redundancy and performance reasons. Such critical situations are present for most control-loop, e.g. for nodes part of, for example, a valve control system, an alarm control system, etc.

Figure 2:
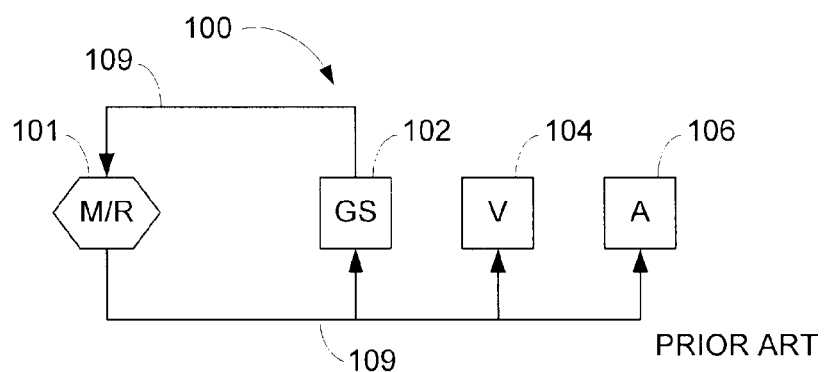
FIG. 2 is a schematic view of a first example of a prior art surveillance network.

FIG. 2 show an example of a prior surveillance network 100, which includes a master/router 101 accessing a gas sensor 102, a shutoff valve 104 and an alarm 106, all interconnected via communication link 109. In the shown example, if the gas sensor 102 detects an anomaly, it communicates with the master/router 101, which will then activate (or regulate) the shutoff valve 104 and activate the alarm 106. Since this functionality is viewed as "safety-critical" in a surveillance network such as surveillance network 100, the communication link 109 is entirely wired.

Figure 3:
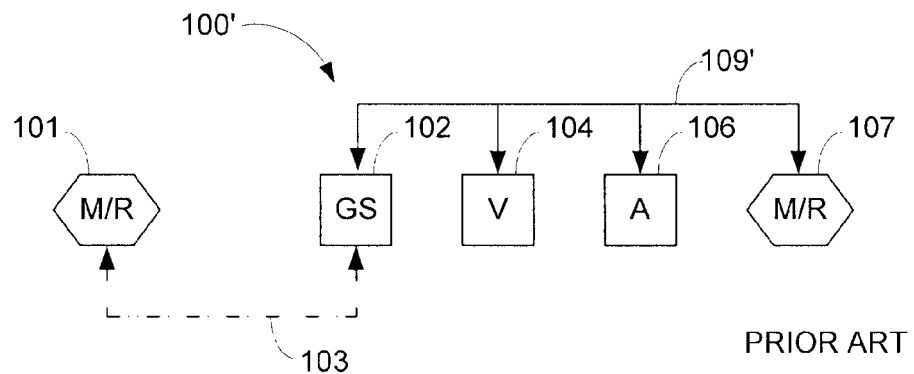
FIG. 3 is a schematic view of a second example of a prior art surveillance network.

Referring now to FIG. 3, if, for practical reasons, a wireless access from the master/router 101 to the gas sensor 102 is desired, such as illustrated by wireless communication link 103, a wired communication link 109' between the gas sensor 102, the valve 104 and the alarm 106 is still required in order to ensure safe and reliable reaction of the surveillance system 100'. To achieve this, a second master/router 107, which will be responsible for managing wired alarms, must be implemented as the master/router 101 cannot access the valve 104 and the alarm 106 across two different types of protocols, e.g. wireless and wired.

Figure 4:
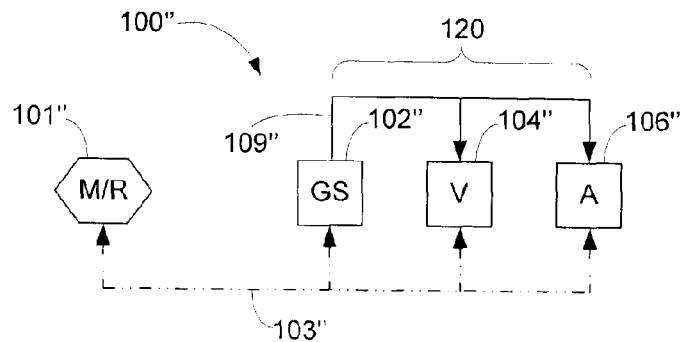
FIG. 4 is a schematic view of an auto-configuring multi-layer network according to an illustrative embodiment of the present invention.

However, as shown in FIG. 4, with a surveillance system 100", which includes an autonomous wired sub-network 120, it becomes possible to deploy the surveillance network 100" wirelessly through expanded wireless communication link 103" and have a wired sub-network 120 to sustain the "safety-critical" function between the gas sensor 102", the valve 104" and the alarm 106" through wired communication link 109"'. In order to properly integrate the autonomous wired sub-network 120 and the wireless communication link 103", each of the nodes (e.g. the master/router 101", the gas sensor 102", the valve 104" and the alarm 106") is an auto-configuring node having a node virtualization function referred to as a virtualizer node. The node virtualization function is the ability of a node to communicate with any other node in the auto-configuring multi-layer network regardless of its communication protocol, i.e. mirrors a node observed on one ComLayer onto another ComLayer where the node is not initially observed, and will be further detailed below.

Thus, deployment of a network such as, for example, the surveillance network 100" of FIG. 4, is easier, cheaper and integrated, and for non-critical operations, the network can still be accessed and controlled wirelessly with a single master/router.

Virtualization Function

The virtualization function emulates the nodes of a given ComLayer onto another ComLayer, for example wired protocol (e.g. CANbus/CANopen) nodes onto wireless protocol (e.g. Zigbee) nodes and vice versa. This functionality allows nodes to communicate with each other regardless of their protocol.

Figure 5A:
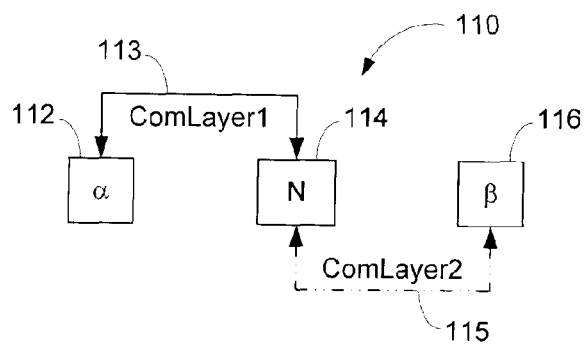
FIGS. 5a, 5b and 5c are schematic views showing communication between nodes over an auto-configuring multi-layer network.

To illustrate the virtualization function, reference will be made to FIGS. 5a, 5b and 5c, which show a network 110 comprising three nodes 112, 114 and 116 with the virtualization function, which will be referred to as virtualizer nodes. Under normal condition, illustrated in FIG. 5a, nodes 112 and 114 communicate with each other using ComLayer1 (wired) link 113 while nodes 114 and 116 communicate with each other using ComLayer2 (wireless) link 115.

Figure 5B:
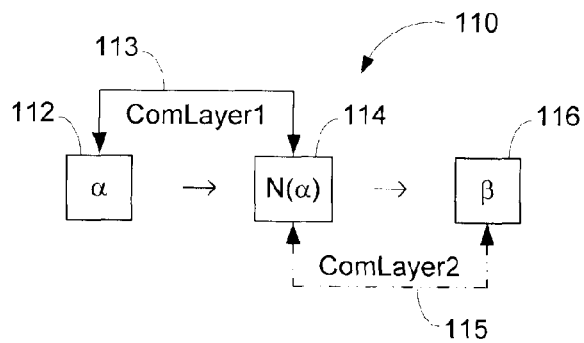

Referring now to FIG. 5b, node 112, having a ComLayer1 ID α, and node 116, a ComLayer2 ID β, cannot communicate directly over the same protocol, e.g. either wired or wireless, for example CANbus/CANopen or ZigBee. In order for node 112 to send information to node 116, node 112 uses node 114 as an intermediary node to relay the information between the two protocols. To achieve this, the virtualizer node 114, using the virtualization function, communicates with the target node 116 as if it was the originating node 112 by pretending to have a ComLayer2 ID N(α) corresponding to the ComLayer1 ID (α) of the originating node 112.

Figure 5C:
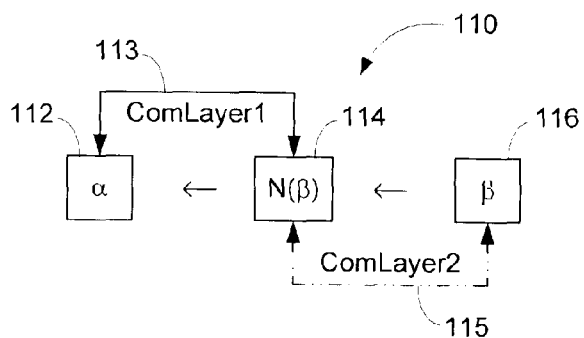

Conversely, with reference to FIG. 5c, in order for node 116 to send information back to node 112, node 116 uses virtualizer node 114 as an intermediary node to relay information between the two ComLayers. To achieve this, the vidtualizer node 114, using again the virtualization function, communicates with the target node 112 as if it was the originating node 116 by pretending to have a ComLayer1 ID N(β) corresponding to the ComLayer2 ID (β) of the originating node 116.

It is to be understood that the virtualization function can be applied to multiple nodes simultaneously.

Virtualization make it so that each virtualizer node having a wired protocol ComLayer acts as a wireless protocol bridge between local wired protocol ComLayers (sometime comprising of a single node, since an un-wired node will detect only itself in its wired protocol ComLayer) thus, in effect, enabling both redundancy and bridging between wired protocol and wireless protocol ComLayers (for example between CANbus/CANopen and ZigBee).

Figure 6:
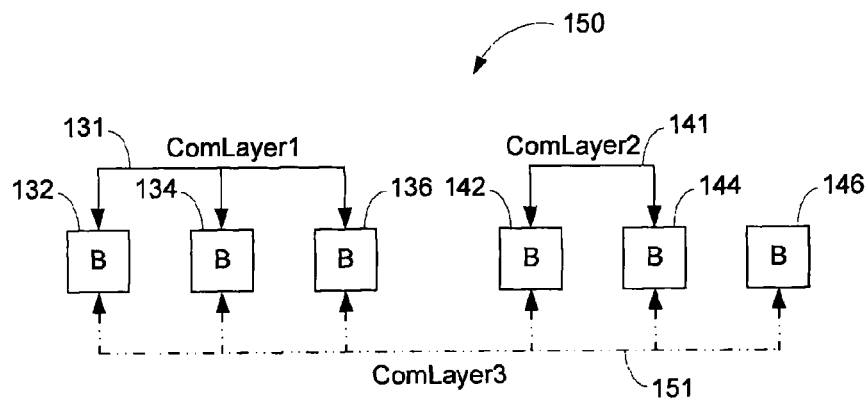
FIG. 6 is a schematic view of an auto-configuring multi-layer network showing the bridging concept.

For example, referring to FIG. 6, there is shown an auto-configuring multi-layer network 150 comprising virtualizer nodes 132, 134, 136, 142, 144 and 146. A first wired protocol link, ComLayer1 link 131, interconnects nodes 132, 134 and 136 while a second wired protocol link, ComLayer2 link 141, interconnects nodes 142 and 144. All of the nodes 132, 134, 136, 142, 144 and 146 are further interconnected via wireless protocol ComLayer2 link 151. Each of the virtualizer nodes 132, 134, 136, 142, 144 and 146 acts as a bridge, enabling communication from any wired protocol ComLayer1 or ComLayer2 links 131, 141 connected to it with wireless protocol ComLayer3 link 151.

Thus, whenever one of the wired protocol links 131 (ComLayer1), 141 (ComLayer2), or wireless protocol link 151 (ComLayer3), is down, a node 132, 134, 136, 142, 144 or 146 may use the other available links 131, 141 or 151. Whenever there are more than one available link 131, 141 or 151, a node 132, 134, 136, 142, 144 or 146 may select which link 131, 141 or 151 to use according to a given priority, for example giving priority to a wired protocol link 131 (ComLayer1), 141 (ComLayer2) over a wireless protocol link 151 (ComLayer3) or the fastest available link.

However, each virtualizer node is more than a simple bridge. Beyond the management of both wireless (less frequent, bigger packets) and wired (more frequent, smaller packets) communications, it also acts as a buffer between wired/wireless communications and actively manages the "virtualization" and transmission load between nodes.

Thus, each virtualizer node acts as both a wired protocol node, for example a CANbus/CANopen node, and a wireless protocol node, for example a Zigbee node (coordinator, router, end-device).

Figure 7:
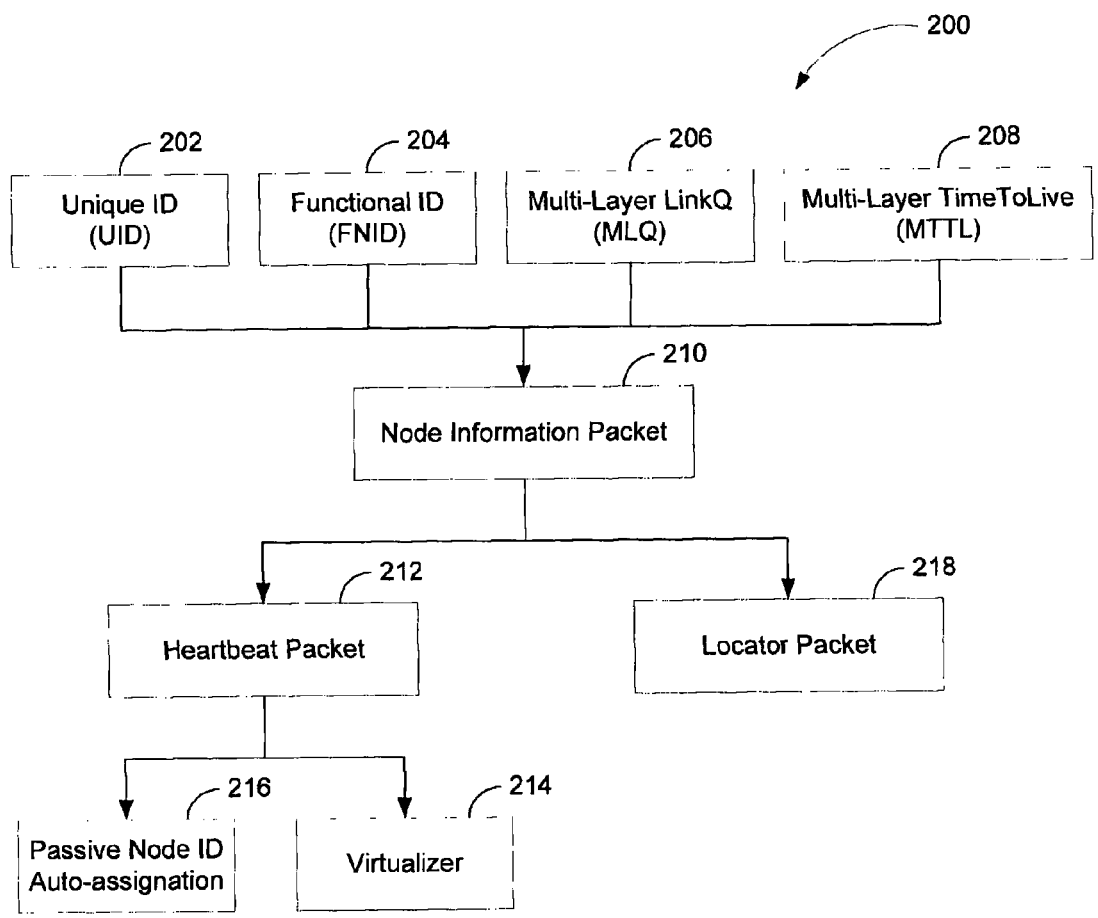
FIG. 7 is a schematic view of the hierarchical structure of the components of the auto-configuring multi-layer network.

Referring now to FIG. 7, there is shown the hierarchical structure 200 of the components of the auto-configuring multi-layer network, which are the node information packet 210, comprising the Unique ID (UID) 202, Functional ID (FNID) 204, Multi-Layer Link Q (MLQ) 206 and Multi-Layer Time To Live (MTTL) 208, the heartbeat packet 212, passive node ID auto-assignation 214, the virtualizer 216 and the locator packet 218, all of which will now be further detailed.

Unique ID (UID)

The UID 202 is a string or a number assigned to a device (node), which serves as a universally unique ID. Examples of such an ID scheme are defined by ISO/IEC 8802-3 and IEEE MAC EUI-64. Any scheme can be used as long as all the nodes in a same network use the same scheme.

Functional ID (FNID)

The FNID 204 defines the current mode of operation of a device (node) and includes two fields:
- an application field that defines an application in which a device currently operates; and
- a function field that defines the function that the device currently fulfills within the current application.

For example:
- application field value: Room Temperature Control; and
- function field: Temperature Sensor 1.

The FNID 204 may be assigned, for example, 16 bits of which the application field occupied 8 bits and the function field the remaining 8 bits.

Within a broadcasting method such as the multi-layer heartbeat scheme, which will be defined further on, the FNID 204 allows passive functional mapping of a network, in turn allowing functional collaboration of nodes without the use of a slow active mapping process.

A number of manufacturer defined functions will exist for a specific manufacturer defined application. Therefore, nodes with cooperation capabilities should be configured to know the applications in which they will operate, which functions it can occupy and with which functions it can cooperate.

TABLE 1

| Room Control application functional mapping example ||
|---|---|
| Application Name | Application ID |
| Room Control | 01 |
| Function Name | Function ID |
| Temperature Sensor 1 | 10 |
| Temperature Sensor 2 | 11 |
| Temperature Sensor 3 | 12 |
| Temperature Sensor 4 | 13 |

TABLE 1-continued

Room Control application functional mapping example

| Heater Controller 1 | 20 |
|---|---|
| Heater Controller 2 | 21 |

Collaboration map

Heater Controller 1 <−> Temperature Sensor 1
Heater Controller 1 <−> Temperature Sensor 2
Heater Controller 2 <−> Temperature Sensor 3
Heater Controller 2 <−> Temperature Sensor 4

FNID timeout = 1 s

Table 1 shows and example of the functional mapping for the room control application with its possible functions and possible collaboration between the various functions.

Multi-Layer Link Quality (MLQ)

The MQL 206 is a value which allows the evaluation of the interaction performance a node can get from another node. Its value is a function of the following characteristics:
- node dynamic response time: relative to its current load;
- node fixed or static response time: determined by the node default or user configuration; and
- link speed: initially set by the node itself according to the slowest of the listed items, the value of which can be seen as an overall node response time and can be represented by a log scale.

TABLE 2

MLQ typical log scale

1: 1 nS
2: 10 nS
3: 100 nS
4: 1 µS
5: 10 µS
6: 100 µS
7: 1 mS
8: 10 mS
9: 100 mS
10: 1 S
11: 10 S
12: 100 S

Table 2 shows an example of a MLQ 206 using 4 bits to represent a log scale.

Within a broadcasting method such as the multi-layer heartbeat scheme, which will be defined further on, the MQL 206 allows any receiving node to passively and continuously know which kind of communication performance it can get from a specific node.

When virtualizing a node, a virtualizer node can choose to increase the MQL 206 in order to take into account degradation related to the virtualizing process or link switch and thus allow a good estimation of node interaction performance. For example, a node depending on a critical collaboration with a broadcasting node could choose to enter a fail-safe mode if it detects that the interaction performance decreases under a required level.

Multi-Layer Time to Live (MTTL)

The MTTL 208 is a counter with an initial value specific to each individual node which can be set by the manufacturer or through an auto-configuration process when the node is connected to the network.

Within a broadcasting method such as the multi-layer heartbeat scheme, which will be defined further on, the MTTL 208 allows a virtualizer node to decide whether or not a node will be virtualized on a further ComLayer. Each time a virtualizing process of a node occurs, its MTTL 208 counter is decreased. When it reaches 0, the node will not be virtualized any further. A constant value must be reserved in order to allow infinite virtualization.

The MTTL 208 may be implemented using, for example, 4 bits with the value 15 reserved for infinite virtualization, leaving 14 possible virtualization stages.

Node Information Packet

The node information packet 210 is a data packet containing at least the four fields, which are: the UID 202, the FNID 204, the MLQ 206 and the MTTL 208 fields. The synergy of the joint information contained in those fields forms the basis of the auto-configuring multi-layer network through the multi-layer heartbeat broadcasting scheme or any other broadcasting scheme.

Possible functional collaboration between two nodes, identified by their UID 202, is established by their FNID 204 and can be decided upon from their MLQ 206 and MTTL 208, all of which are broadcasted in their respective node information packet 210.

The node information packet 210 must be broadcasted in a format recognizable by virtualizer nodes since any of its fields may be modified by a virtualizer node in the communication process.

Multi-Layer Heartbeat Packet

The multi-layer heartbeat packet 212, from hereon end referred to as the heartbeat 212, is a packet sent at defined intervals by all nodes and propagated through the various ComLayers by the virtualizer nodes. Since the heartbeat 212 may propagate over different types of communication layers (i.e. protocols), its content is not defined in a fixed manner. The heartbeat 212 should, however, contain the following items in order to sustain the auto-configuring multi-layer network functionalities:
- an indicator that this packet is an auto-configuring multi-layer network heartbeat 212;
- the source node ComLayer ID, which is required in order to allow mirroring by virtualizer nodes and for building local node registries; and
- a node information packet; and
- optionally, a heartbeat interval.

The heartbeat 212 packet may contain additional information in order to perform optimization of current ComLayer use.

The presence of a node heartbeat 212 on a given ComLayer indicates that the node is alive on that specific ComLayer. Conversely, the absence of a node heartbeat 212 on a given ComLayer indicates that the node is dead on that specific ComLayer. Accordingly, a device (node) is considered alive upon the reception of a heartbeat 212 from that device and is considered dead if no heartbeat 212 is received from that device within a fixed period or, if used, the device heartbeat interval.

In the auto-configuring multi-layer network, all nodes send a heartbeat 212 packet at respective defined intervals that are not necessarily the same for every node but are static in time.

Since all nodes on the auto-configuring multi-layer network receive the node information packet 210 via the heartbeat 212, each node is capable of passively building a node map and a functional map of the network. Functional mapping then allows a node to trigger functional collaboration. If a node involved in a collaboration discovers by the timeout of the heartbeat 212 that the collaborative node has died, it may search its functional map for other nodes capable of occupying the same functionality and thus start a new redundant collaboration.

It is the task of the virtualizer nodes to handle conversion of the heartbeat 212 and it transmission from a ComLayer format to another ComLayer format.

Upon reception of a heartbeat 212, which contains the node information packet 210, a node is in position to decide whether or not it will continue to collaborate or trigger a collaboration with another node, which choice is based on the MLQ 206 and/or MTTL 208.

With this scheme, any receiving node can decide to occupy a FNID 204 which has been left free.

The heartbeat 212 pace can be fixed through its heartbeat interval according to functional and network response time requirements. The faster this pace, the faster the redundancy will trigger. However, faster pace also means more data transfer which might contribute in ComLayer link performance degradation. It should be noted that the combination of a statically defined heartbeat interval, with statically defined MLQ 206 and MTTL 208, results in functional and network mapping processes occurring in a deterministic manner.

Each node may build a map of the auto-configuring multi-layer network by simply maintaining a registry of entries containing the following information, for each node from which it receives a heartbeat 212:

node UID 202;
node ComLayerID;
node device heartbeat interval (optional);
last MLQ 206 (optional); and
last MTTL 208 (optional).

A node entry is added or updated every time a heartbeat 212 is received. A node entry is remove if no heartbeat 212 is receive within a fixed period or, optionally, within the node device heartbeat interval.

The node building the registry is then able to locate and instantiate communication with any recorded node using its UID 202 or ComLayerID.

A pseudo-geographic view may also be created, assuming that the MLQ 206 can be represented as a distance.

The functional mapping is performed similarly to the network mapping except that the FNID 204 is added to the registry maintained by the node building the functional map. The maintaining node is then able to instantiate collaboration with nodes capable of fulfilling the required function, as indicated by their FNID 204.

Figure 8:
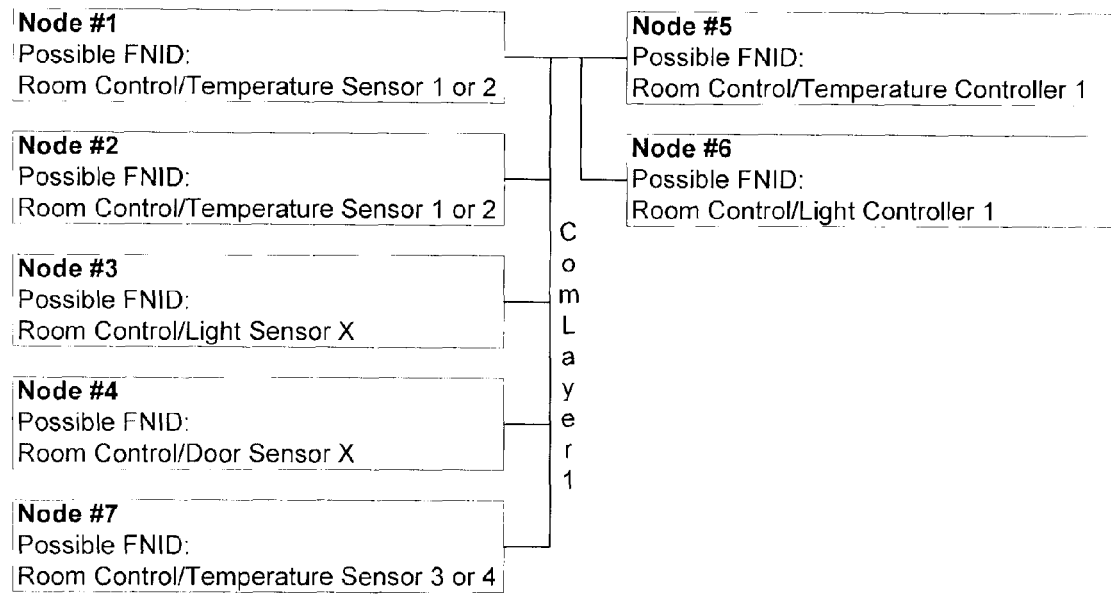
FIG. 8 is a schematic view of an example of the functional states of nodes in an auto-configuring multi-layer network at boot up.

Referring to FIG. 8, there is shown an example of the functional states of nodes in an auto-configuring multi-layer network at boot up. Each node contains a set of user configured or manufacturer fixed rules which define which FNID (function) a node can occupy within the network. In the illustrated example, Node 1 can occupy the FNID (function) of "Temperature sensor 1 or 2" within the application "Room Control".

Figure 9:
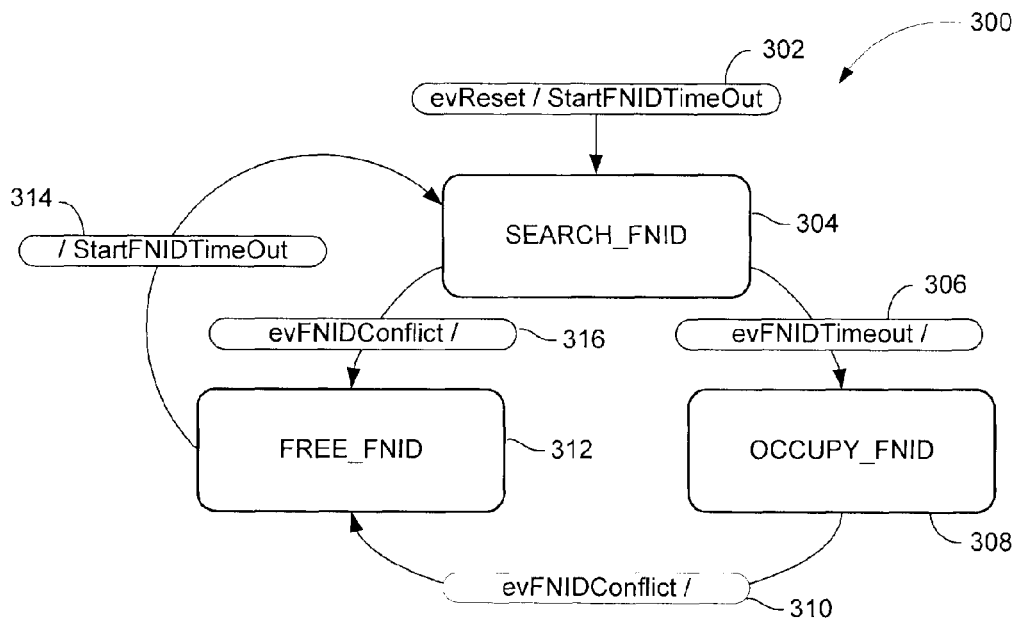
FIG. 9 is a state diagram of the FNID selection state machine.

FIG. 9 shows a FNID selection state machine 800. The states and conditions/transitions of the state machine 400 are indicated by blocks 302 to 316.

The state machine 800 is initiated at block 302 when a node is booted up where it starts a timeout counter. The node then enters, at block 304, the "SEARCH_FNID" state and selects a free FNID from amongst its possible FNIDs and enters a waiting period.

At block 306, if no other node sends a heartbeat 212 (see FIG. 7) containing the selected FNID within the timeout period, then the node enters, at block 308, the "OCCUPY_FNID" state and starts accomplishing the behavior associated with the FNID function.

Then, at block 310, if a conflicting heartbeat 212 is received (i.e. with the same FNID), the node enters, at block 312, the "FREE_FNID" state where the FNID is freed. Following which, at block 314, the node resets its timeout counter and proceeds back to the "SEARCH_FNID" state at block 402.

If, at block 316, if a conflicting heartbeat 212 is received within the timeout period, then the node enters the "FREE_FNID" state where the FNID is freed. Following which, once more at block 314, the node resets its timeout counter and proceeds back to the "SEARCH_FNID" state at block 402.

Boot Up Sequence Example

Referring back to FIG. 8, there will be illustrated an example of the FNID selection during the boot up sequence.

We will assume that Node 2 is the first node to be powered on, it first sends a heartbeat containing an empty FNID field to indicate that it does not occupy any specific function at the moment. Node 2 then selects a free FNID amongst its list of possible FNIDs, i.e. "Room Control/Temperature Sensor 1" or "Room Control/Temperature Sensor 2". Assuming "Room Control/Temperature Sensor 1" is selected, then Node 2 enters a wait period. If no other node sends a heartbeat containing this FNID within the timeout period, Node 2 starts occupying the selected FNID and accomplishes it behavior.

Nodes 1, 3, 4, 5, 6, 7 then boot up and send their respective heartbeats with an empty FNID filed.

Since Node 2 does not receive any conflicting heartbeats, it starts to occupy and accomplish the "Room Control/Temperature Sensor 1" functionality. A heartbeat with the FNID field set to "Room Control/Temperature Sensor 1" is then sent.

Node 1 receives a heartbeat from Node 2 indicating that it now occupies the "Room Control/Temperature Sensor 1" FNID. Node 1 then selects the next free FNID from its list of possible FNIDs, which is "Room Control/Temperature Sensor 2" FNID. Nodes 3, 4 and 7 occupy function which are no conflicting with Nodes 1 and 2.

Since Node 1 does not receive any conflicting FNID, it starts to occupy and accomplish "Room Control/Temperature Sensor 2 functionality. A heartbeat with the FNID field set to "Room Control/Temperature Sensor 2" is then sent.

Node 5 comes with a fixed FNID which is "Room Control/Temperature Controller 1".

From its collaboration rule set, it knows it can interact with nodes acting as FNIDs "Room Control/Temperature Sensor 1 or 2". Performing network functional mapping using its node registry, it knows that Nodes 1 or 2 can be used in its collaboration. Since Node 2 occupies "Room Control/Temperature Sensor 1" FNID, Node 5 establishes collaboration with Node 2. Node 1 is kept as a backup which could be used as a redundant sensor. In case Node 2 dies, i.e. absence of a heartbeat.

Node 6 starts collaboration with Node 3. Other nodes behave as stand alone sensors and can be accessed by any monitoring node.

Virtualizer Node

The virtualizing function is accomplished by a virtualizer 214 node (see FIG. 7), which node has access to at least two ComLayers. It mirrors a node observed on a given ComLayer onto another ComLayer where the node is not observed. On the virtualizing side, the node behaves like any other node. The only difference is that the MLQ 206 field of the node information packet 210 broadcasted in the heartbeat 212 may be increased by the virtualizer node 214 in order to take into account the performance degradation due to the virtualizing process (i.e. communication layer switch and mirroring). The MTTL 208 is also decrease by one every time it goes through a virtualizer 214 node until it reaches 0 in order to limit the number of virtualizer 214 nodes a communication will go through. This scheme allows communication between two nodes transparently over MTTL 208 number of successive ComLayers.

The virtualizing process occurs when a virtualizer 214 node sees a node on one ComLayer but not on any other one to which it has access. Observation is made through the heartbeat network mapping scheme. Any node can be a virtualizer 214 node. Any virtualizer 214 node can also decide the maximum number of nodes it will virtualize in function of it processing capabilities. This maximum could be preset or/and dynamically changed in function of the node's available processing power. This maximum could be set for each ComLayer available and/or as a total number of virtualized nodes. This allows the implementation of virtualizer 214 nodes on low processing power devices.

All virtualizer 214 node have the role of restoring a communication link between other nodes. Accordingly, a communication link may be backed by a plurality of nodes without requiring any configuration.

Placing many virtualizer 214 node between the same two communication links also has interesting effects. Each virtualizer 214 node added will in fact strengthen the bridge between the two ComLayers, strengthen the redundancy and increase the throughput speed levels by handling a part of the traffic.

A virtualizer 214 node will not virtualize a node whose MTTL 206 has reached 0, allowing creation of virtual network boundaries, which will be further detailed below. However, as previously mentioned, a special MTTL 206 constant exists so as to allow infinite virtualisation of a node.

The virtualizing process may be seen as some sort of "passive meshing" behavior since it is not performing any search for a routing path.

Virtualizer Node Assignment State Machine

Figure 10:
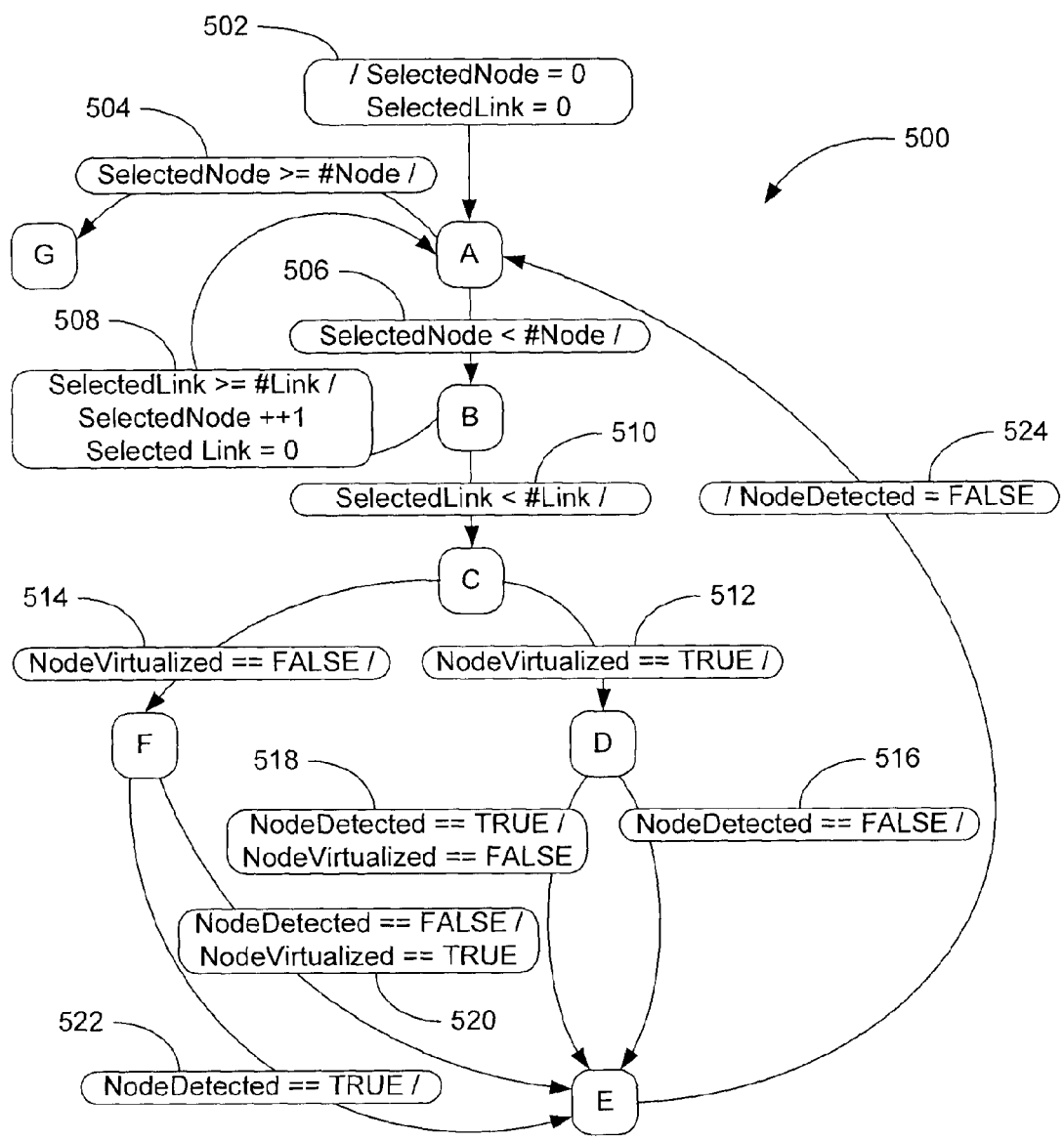
FIG. 10 is a state diagram for the virtualizer node assignation state machine.

FIG. 10 shows a virtualizer 214 node assignment state machine 500. The states and conditions/transitions of the state machine 500 are indicated by blocks A to G and 502 to 522, respectively.

The state machine 500 is initiated whenever there is a change in the communication links (or when the auto-configuring multi-layer network is initiated). The state machine 500 starts at block 502 by selecting the first node entry (entry 0), first communication link (link 0) in its node registry and enters state A.

At block 504, if the last node entry of the node registry has been selected, then the state machine 500 proceeds to state G where it terminates.

At block 506, if the selected node entry of the node registry has not been selected, then the state machine 500 proceeds to state B.

The state machine 500 then verifies, at block 508, if the selected communication link is the last communication link entry for the selected node entry. If so, the next node entry, first communication link, is selected and the state machine 500 proceeds back to state A. If the selected communication link is not the last communication link entry of the selected node entry, then, at block 510, the state machine 500 proceeds to state C.

If, at block 512, the node listed in the selected communication link entry has been virtualized, the state machine 500 proceeds to state D, if not, at block 514, the state machine 500 proceeds to state F.

In state D, the state machine 500 verifies if the node listed in the selected communication link entry is detected (e.g. its node information packet 210 is detected), if not, at block 516, it proceeds to state E, if so, at block 518, it sets the node as not being virtualized (it is now detected) and proceeds to state E.

Figure 11:
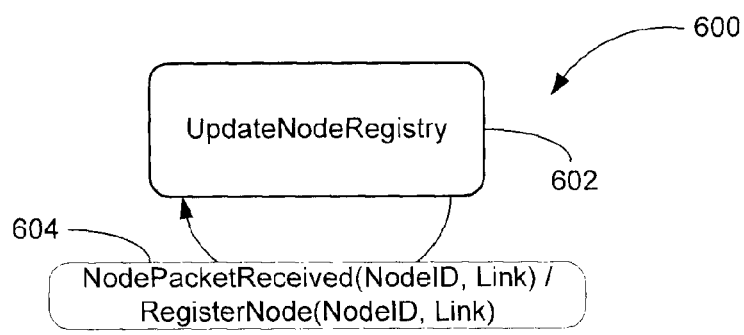
FIG. 11 is a state diagram the node registry update state machine.

In state F, at block 520, the state machine 500 verifies if the node listed in the selected communication link entry is detected (e.g. its node information packet 210 is detected), if not, at block 520, it sets the node as being virtualized, executes a virtual ID auto-assignation state machine similar to the node ID auto-assignation state machine that will be detailed further below and proceeds to state E, if so, at block 522, it proceeds to state E Node Registry Update State Machine FIG. 11 shows a node registry update state machine 600 that is executed when a new node information packet 210 is received. The states and conditions/transitions of the state machine 600 is indicated by blocks 602 to 604.

The state machine 600 starts in state 602 with an initial node registry (which may be empty at startup) and, at block 604, verifies if a node information packet 210 is received, if so the state machine uses the information from the node information packet 210 to create a new entry in the node registry if the UID 202 of the node information packet 210 is not registered in the node registry or updates the fields of the corresponding entry if the UID 202 of the node information packet 210 is already registered in the node registry.

Furthermore, an entry in the node registry may be removed if a corresponding node information packet 210 (e.g. with the same UID 202) is not received within a given period of time.

It is to be understood that not all of the nodes of an auto-configuring multi-layer network may have the processing capability required to be a virtualizer 214 node.

Auto-Configuration Example

Figure 12:
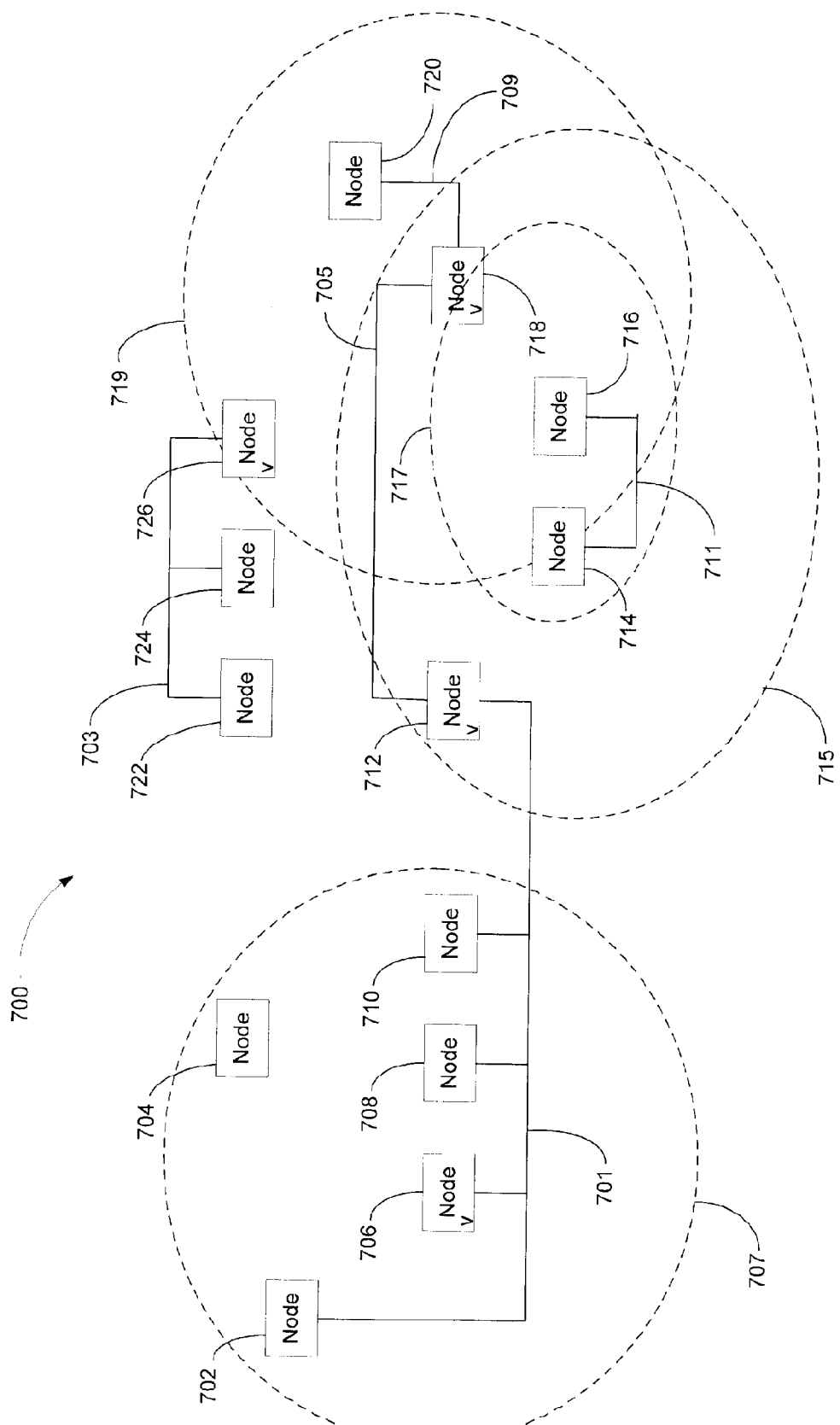
FIG. 12 is a schematic view of an auto-configuring multi-layer network before auto configuration.

Referring to FIG. 12, there is shown an example of an auto-configuring multi-layer network 700 comprising:
- an access point node 702;
- nodes with low processing capabilities, which could not be assigned specific functions, 704, 708, 710, 714, 716, 720, 722, 724; and
- nodes with the virtualization function capability 706, 712, 718, 726.

At startup, the auto-configuring multi-layer network 700 also comprises:
- five wired protocol ComLayers 701, 703, 705, 709, 711; and
- four wireless protocol ComLayers 707, 715, 717, 719.

In FIG. 12, the nodes having the virtualization function capability are identified with a "v" (i,e. virtualizer nodes).

Auto Configuration Sequence

At startup, the devices (e.g. nodes 702, 704, 706, 708, 710, 712, 714, 716, 718, 720, 722, 724, 726) are powered ON asynchronously. The nodes 702, 704, 706, 708, 710, 712, 714, 716, 718, 720, 722, 724, 726 using select a local address, which is done using a node ID assignation state machine which will be detailed further below.

The devices start building their respective node registries by exchanging node information packet 210 using respective heartbeats.

On the wired protocol Comlayers 701, 703, 705, 709, 711, the heartbeats are sent by each node, for example, every second. This allows any node to discover any other node on the wired protocol Comlayer at any time. When a node discovers another node, it adds the discovered node's information to its node registry. In the same way, a node can be removed from the node registry when it disappears from the network, i.e. its node information packet 210 is not received anymore.

As for the wireless protocol ComLayers 707, 715, 717, 719, heartbeats are broadcasted at device boot up and then at a slower interval in order not to saturate the wireless protocol Comlayers 707, 715, 717, 719, for example at every 10 seconds or slower.

This can be similarly performed on any type of Comlayer as long as node information packets 210 are exchanged between every node connected on it at a rate that allows network functionality to be fulfilled.

The nodes with the virtualization function capability 706, 712, 718, 726 will start to analyze their node registry to figure out which nodes require virtualization.

TABLE 3

Sample node registry before virtualization

| UID | ComLayer1 ID (wired) | ComLayer2 ID (wired) | ComLayer3 ID (wireless) | MLQ | FNID |
|---|---|---|---|---|---|
| 0x0100402000 | 03 | Not present | 0x23325523 | 100 | Valve Controller |
| 0x0100402402 | 04 | 03 | Not present | 120 | Humidity Sensor |
| 0x0100402154 | Not present | 20 | 0x53325746 | 900 | Simple Virtualizer |

TABLE 4

Sample node registry after virtualization

| UID | ComLayer1 ID (wired) | ComLayer2 ID (wired) | ComLayer3 ID (wireless) | MLQ | FNID |
|---|---|---|---|---|---|
| 0x0100402000 | 03 | 54 (virtualized) | 0x23325523 | 100 | Valve Controller |
| 0x0100402402 | 04 | 03 | 0x83325349 (virtualized) | 120 | Humidity Sensor |
| 0x0100402154 | Not enough processing available (not virtualized) | 20 | 0x53325746 | 900 | Simple Virtualizer |

Table 3 and Table 4 show an example of a node registry before and after virtualization. It may be observed that the devices (nodes) 0x0100402000 and 0x0100402402 are virtualized on wired protocol ComLayer2 and wireless protocol ComLayer3, respectively. However the current virtualizer node determined that it did not have enough processing power to virtualize a third device, leaving it for another virtualizer node. This allows the virtualizer node to never reach overload, thus helping network stability.

Communication Path Examples

Figure 13:
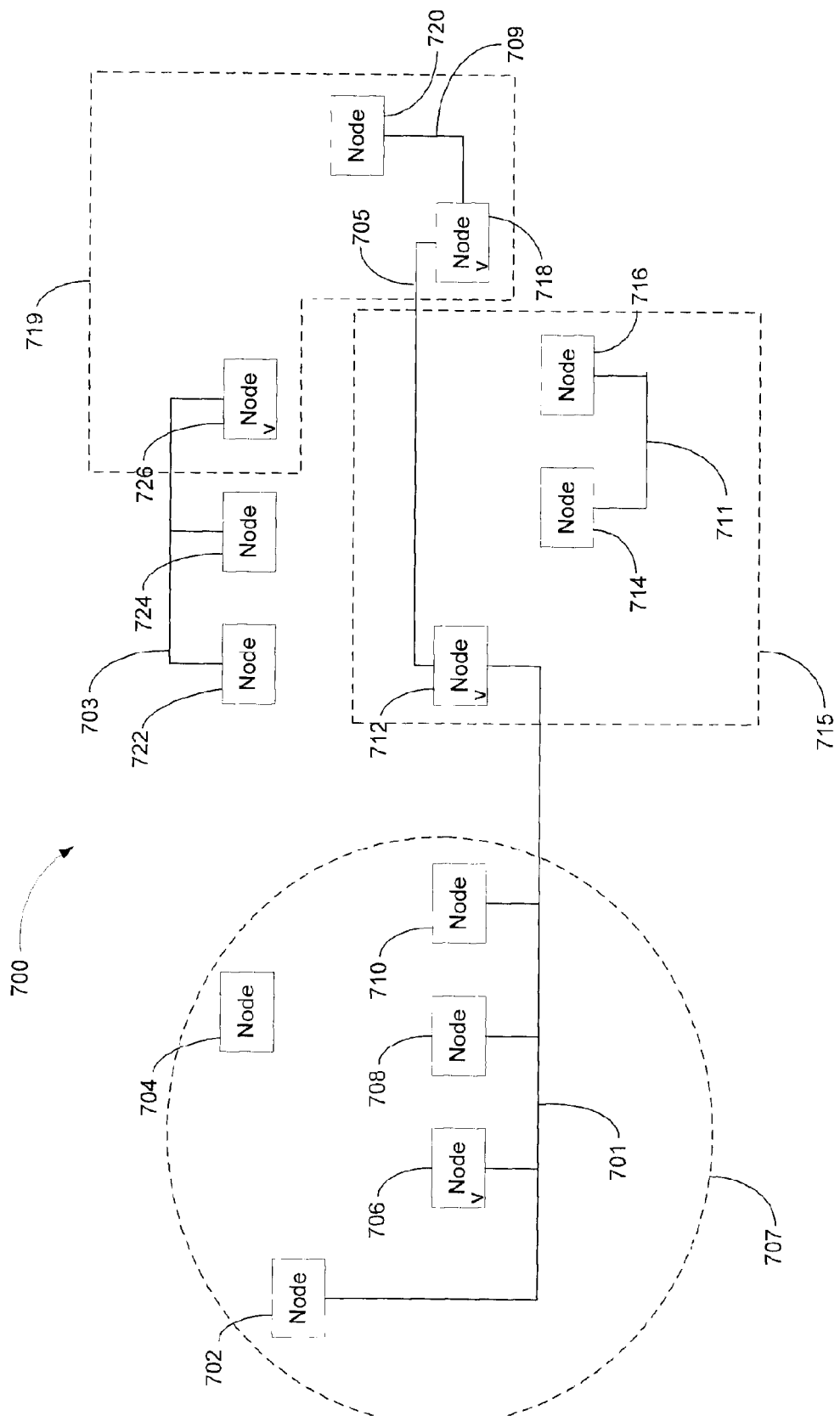
FIG. 13 is a schematic view of an auto-configuring multi-layer network after auto configuration.

Case 1:

Referring to FIG. 13, node 702 wants to communicate with node 704. Node 702 looks for node 704's UID in its node registry and locates node 704 on wireless protocol ComLayer 707 and on wired protocol ComLayer 701. On the wireless protocol ComLayer 707 nodes 702 and 704 are virtualized by node 706 and on wired protocol ComLayer 701, node 704 is also virtualized by node 706 which means node 702 decides if it uses wireless ComLayer 707 or wired protocol ComLayer 701 to reach the node 704. If it selects wired protocol ComLayer 701, the communication will address as if on a wired communication link but will be transmitted by wire to node 706 and then wirelessly from node 706 to node 704. The MLQ field can then be used to select the optimal link.

Figure 14:
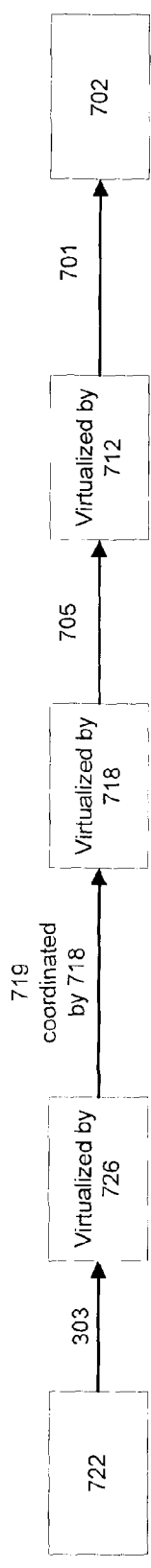
FIG. 14 is a schematic view of how node 722 can be seen by node 702 according to the network of FIG. 13.

Case 2:

Node 702 wants to communicate with node 722, which is some sort of worst case scenario. FIG. 14 illustrates how node 722 can be seen by node 702.

Figure 15:
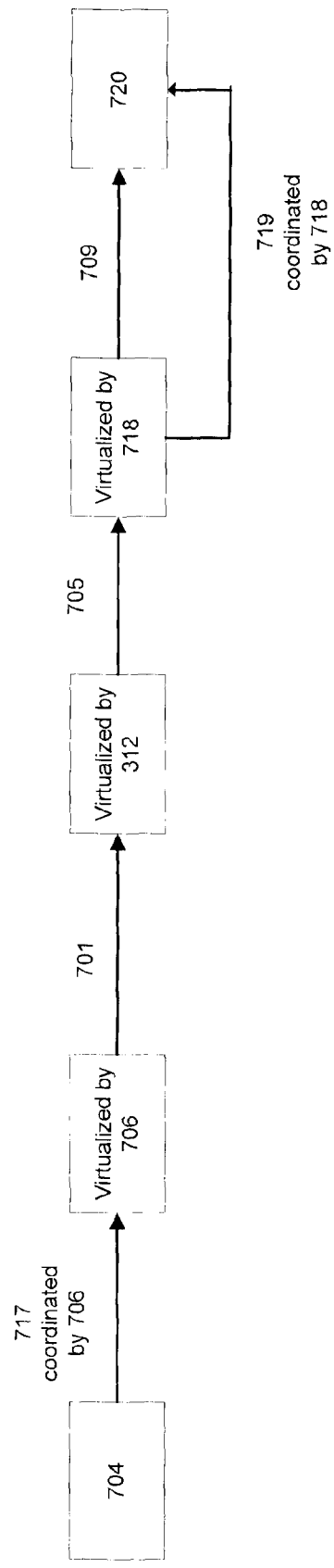
FIG. 15 is a schematic view of how node 704 can be seen by node 720 according to the network of FIG. 13.

Case 3:

Node 720 wants to communicate with node 704. FIG. 15 illustrates how node 704 can be seen by node 720. It may be observed that there is a redundant link between node 720 and 718. The MLQ field can then be used to select the optimal link.

Heartbeat Propagation by Virtualizer Nodes

Figure 16:
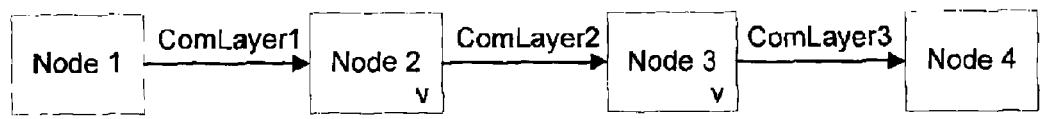
FIG. 16 a schematic view of an example of the propagation of the heartbeat through different ComLayers of an auto-configuring multi-layer network via virtualizer nodes.

Referring to FIG. 16, there is shown an example of the propagation of the heartbeat through different ComLayers of an auto-configuring multi-layer network via virtualizer nodes.

Node 1 sends a heartbeat on ComLayer1 with a MLQ of, for example, 100 ms, which is the response time of a sensor associated with Node 1. Virtualizer Node 2 receives the heartbeat from Node 1 on ComLayer1, virtualizes Node 1, add 20 ms to the MLQ in order to take into account virtualization delay. It then sends the virtualized heartbeat of Node 1 on ComLayer 2 with a MLQ of 120 ms.

Virtualizer Node 3 receives the virtualized heartbeat of Node 1. Similarly, 50 ms is added to the MLQ in order to take into account the current load of virtualizer Node 3. Virtualizer Node 3 then sends the virtualized heartbeat of Node 1 on CornLayer3 with a MLQ of 170 ms. Node 4 receives the heartbeat from virtualized Node 1 on ComLayer3. Node 4 can then decide whether or not it will interact with Node 1 based on its MLQ or other condition.

The collaboration criteria could be, for example:
if MLQ<100 ms: use as primary sensor in a close loop collaboration;
if 100 ms<MLQ<500 ms: use node only as a backup sensor in a close loop collaboration; and
if 500 ms<MLQ: do not use node.

Virtualization Boundary

Figure 17:
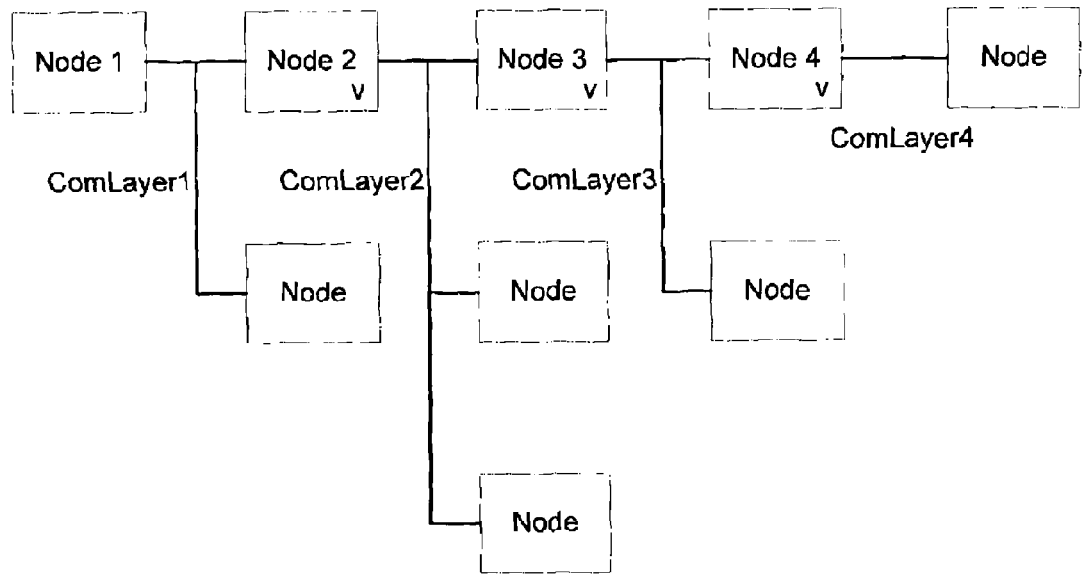
FIG. 17 is a schematic view of an example of the stopping of the propagation of the heartbeat through different ComLayers of an auto-configuring multi-layer network via virtualizer nodes.

Referring to FIG. 17, there is shown an example how the propagation of the heartbeat through different ComLayers of an auto-configuring multi-layer network via virtualizer nodes is stopped.

Node 1 sends a heartbeat with a MTTL set to 2. Virtualizer Node 2 receives the heartbeat of Node 1 and, since the MTTL is greater than 0, virtualizes Node 1 on ComLayer2. The MTTL of virtualized Node 1 is decreased to 1 and then sent on ComLayer2.

Virtualizer Node 3 receives the heartbeat of virtualized Node 1 and, since the MTTL is greater than 0, virtualizes Node 1 on ComLayer3. The MTTL of virtualized Node 1 is decreased to 0 and then sent on ComLayer3.

Virtualizer Node 4 receives the heartbeat of virtualized Node 1 and, since the MTTL is 0, does not virtualize Node 1 on ComLayer4.

Traffic Load Diffusion

Figure 18:
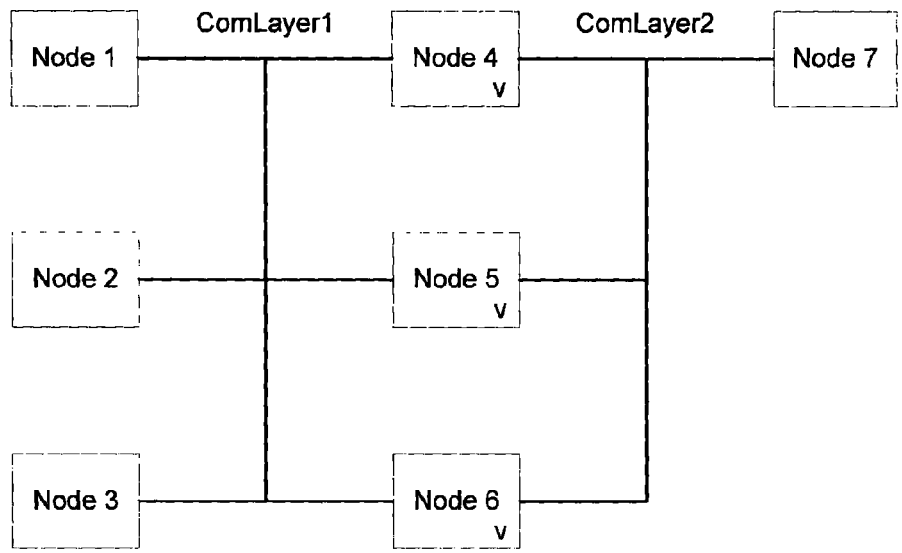
FIG. 18 is a schematic view of an example of the sharing of the virtualizing burden between multiple nodes in an auto-configuring multi-layer network.

Referring to FIG. 18, there is shown an example how the virtualizing burden can be shared between multiple nodes in an auto-configuring multi-layer network.

Assuming Nodes 4, 5 and 6 each have a three-node virtualizing capacity, this means that a total virtualization of nine nodes can occur on the auto-configuring multi-layer network.

The auto-configuring multi-layer network is configured in the following manner at boot up:
 virtualizer Node 4 virtualizes Node 1 on ComLayer2;
 virtualizer Node 5 virtualizes Node 2 on ComLayer2;
 virtualizer Node 6 virtualizes Node 3 on ComLayer 2; and
 virtualizer Node 6 virtualizse Node 7 on ComLayer1.

If virtualizer Node 4 cannot virtualize nodes anymore, virtualizer Nodes 5 or 6 can take over the virtualization process for Node 1 according to their current capacity. Accordingly, the auto-configuring multi-layer network may be reconfigured in the following manner:
 virtualizer Node 5 virtualizes Node 1 on ComLayer2;
 virtualizer Node 5 virtualizes Node 2 on ComLayer2;
 virtualizer Node 6 virtualizes Node 3 on ComLayer2; and
 virtualizer Node 6 virtualizes Node 7 on ComLayer1.

Network Asymmetric Virtual Boundaries

Figure 19:
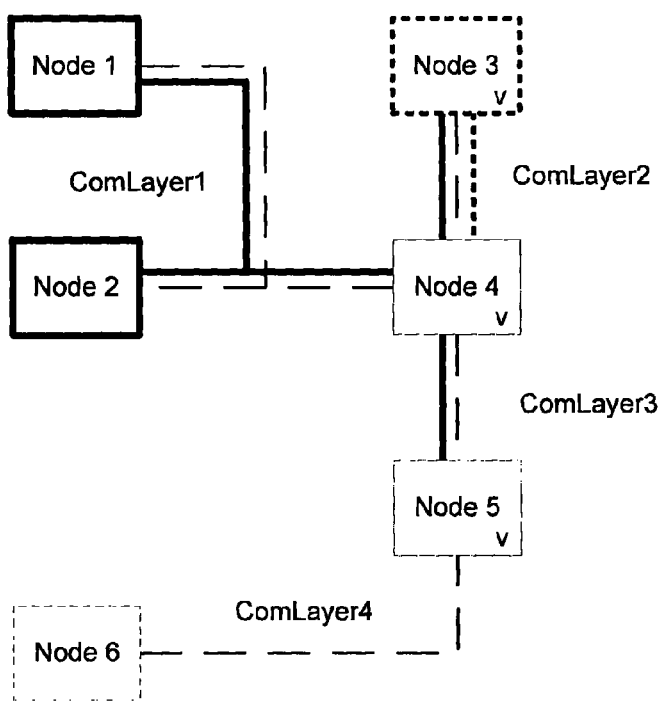
FIG. 19 is a schematic view of an example of the creation of asymmetric network boundaries in an auto-configuring multi-layer network.

Referring to FIG. 19, there is shown an example how asymmetric network boundaries can be created in an auto-configuring multi-layer network in order to provide performance and security control.

The auto-configuring multi-layer network is configured such that nodes are assigned the following initial MTTL:
 Nodes 1 and 2: MTTL=1;
 virtualizer Node 3: MTTL=0;
 Node 6: MTTL>=2; and
 virtualizer Nodes 4 and 5: arbitrary values.

Nodes 1 and 2 are virtualized on ComLayer2 and ComLayer3 by virtualizer Node 4 and, since their respective MTTL is decreased to 0 by virtualizer Node 4, Nodes 1 and 2 are not virtualized further by virtualizer Node 5. As for virtualizer Node 3, it is not virtualized by virtualizer Node 4 since its MTTL is already 0. Node 6 is virtualized on ComLayer3 by virtualizer Node 5 and virtualized by virtualizer Node 4 on ComLayer1 and ComLayer2.

The end result is that Node 6 can be accessed by Nodes 1 and 2 but Node 6 cannot access Nodes 1 and 2. Thus, each node possesses its own virtual boundary which is defined by its initial MTTL, which can be fixed by the user. This behavior can be used to create sub-networks, allowing performance increases and/or to instantiate security policies.

Passive Node ID Auto-Assignation

Referring back to FIG. 7, the passive node ID auto-assignation 216 depends on the heartbeat packet 212. However, it could be used with any scheme that does not necessarily contain the node information packet 210. The passive node ID auto-assignation 216 simply requires a packet containing the source ComLayer ID to be broadcasted on a network branch at a defined interval.

Although the passive node ID auto-assignation 216 is designed for use on an auto-configuring multi-layer network, it can also be implemented on any network layer which presents the ComLayer characteristics and does not have a concurrent protocol-specific address self-assignation scheme The passive node ID auto-assignation 216 allows a node to passively detect free ComLayerIDs in order to self-assign one as its own. This allows nodes with address self-assignation and nodes with fixed addresses to be used on the same network.

Used within the auto-configuring multi-layer network, the passive node ID auto-assignation 216 has the advantage of requiring no additional data to be sent over the network, the heartbeat packet 212 containing all of the required information.

Passive Node ID Auto-Assignation State Machine

Figure 20:
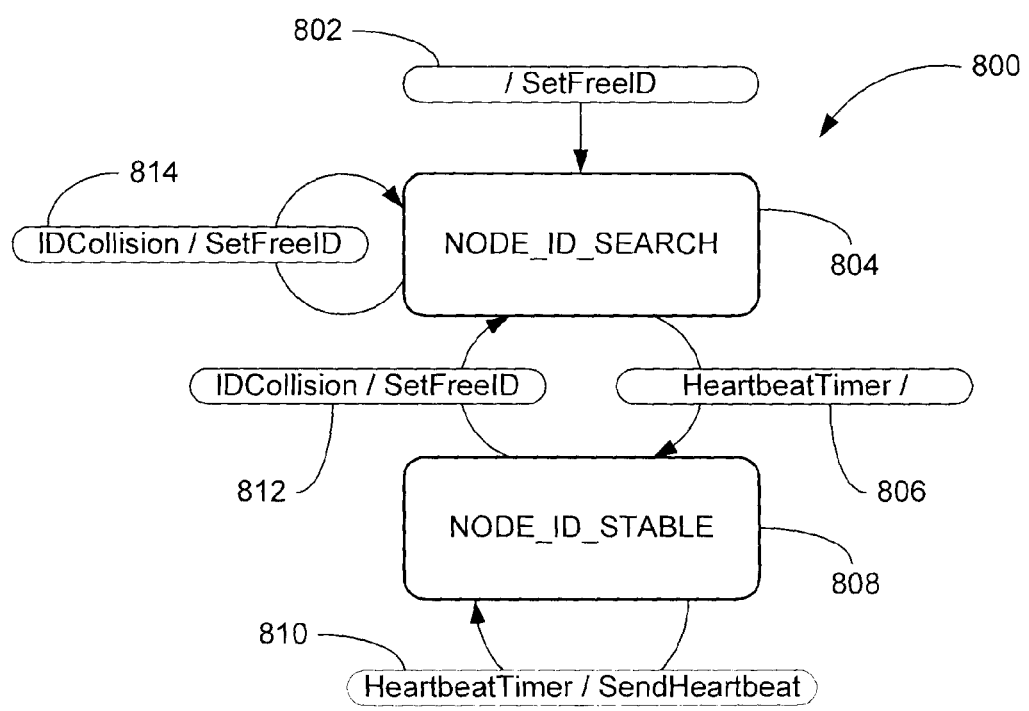
FIG. 20 is a state diagram the passive node ID auto-assignation state machine.

FIG. 20 shows a passive node ID auto-assignation state machine 800. The states and conditions/transitions of the state machine 800 are indicated by blocks 802 to 814.

The state machine 800 is initiated at block 802 when a node has its ComLayerID cleared (or does not have a ComLayerID, such as when the network is initiated). It then enters, at block 804, the "NODE_ID_SEARCH" state where the node selects a ComLayerID from unused ComLayerID present in the registry maintained by the node. In that state, the node is not authorized to send anything else then heartbeats to the rest of the network.

At block 806, the node initiates its heartbeat timer at the end of which it enters, at block 808, the "NODE_ID_STABLE" state where the node can communicate through the network. At block 810, the node again initiates its heartbeat timer at the end of which it sends a heartbeat with its ComLayerID. Then, at block 812, if a ComLayerID collision occurs, i.e. a heartbeat with the same ComLayerID is received, the node clears its ComLayerID and proceeds back to the "NODE_ID_SEARCH" state at block 904.

While in the "NODE_ID_SEARCH" state, at block 814, the node continues to monitor for ComLayerID collisions in which case it clears its ComLayerID and selects a new one.

It is to be understood that depending on when each node starts its timer or which node sends it's heartbeat first for nodes having the same priority time, this may affect the final configuration of the auto-configuring multi-layer network.

Multi-Layer Locator Packet

Referring back to FIG. 7, the multi-layer locator packet 218 is a packet sent by a node when a collaboration is triggered by a user. It allows nodes to recognize each other and then trigger a collaboration behavior over the auto-configuring multi-layer network.

The multi-layer locator packet 218 contains the following:
 an indicator that this packet is a locator packet; and
 a node information packet 210.

A user can trigger a node, for example by pressing a button on a device associated with the node, to start broadcasting a locator packet 218 at a regular interval for a predetermined period. Any node needing node localization can catch the locator packet 218 and begin its interaction with the node.

The broadcasting, or yelling, of a locator packet 218 can be of two different types: localization yelling and collaboration yelling. Localization yelling is triggered by a localization request and has an associated localization yelling period while collaboration yelling is triggered upon a successful collaboration assignation and has an associate collaboration yelling period.

Node Localization Triggering

Figure 21:
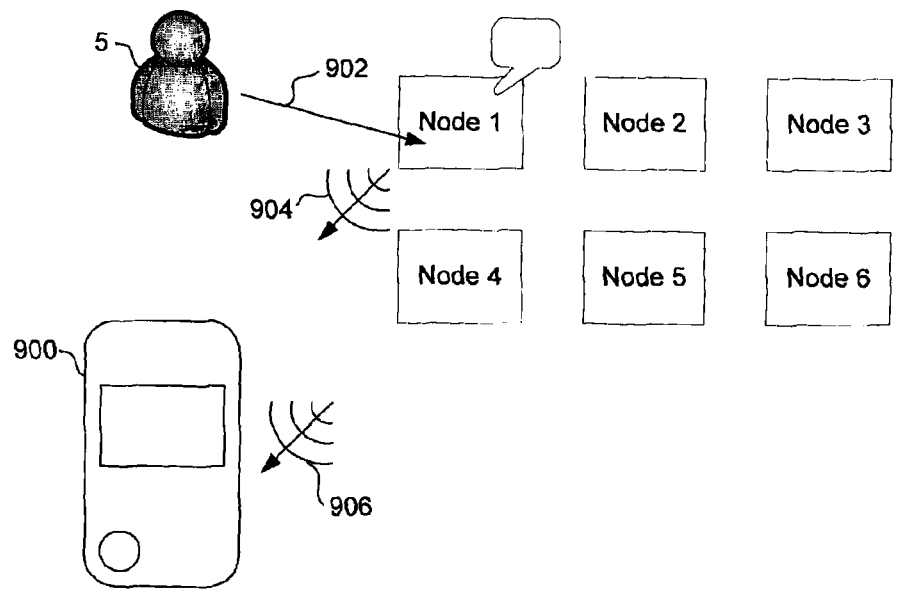
FIG. 21 is a schematic view of an example of a user triggered node localization using the multi-layer locator packet functionality.

Referring to FIG. 21, there is shown an example of a user triggered node localization using the multi-layer locator packet 218 (see FIG. 7) functionality.

A user 5 triggers 902 the locator packet broadcast on Node 1, for example by shortly pressing a multi-use button on the device associated with Node 1. Pressing shortly the multi-use button a second time may be used, for example, to stop the broadcast.

Node 1 then starts localization yelling 904 and a pod 900 receives 906 the locator packet allowing Node 1 localization and configuration retrieval. Node 1 then stops localization yelling 904 after the localization yelling period expires.

Node Collaboration Triggering

Figure 22:
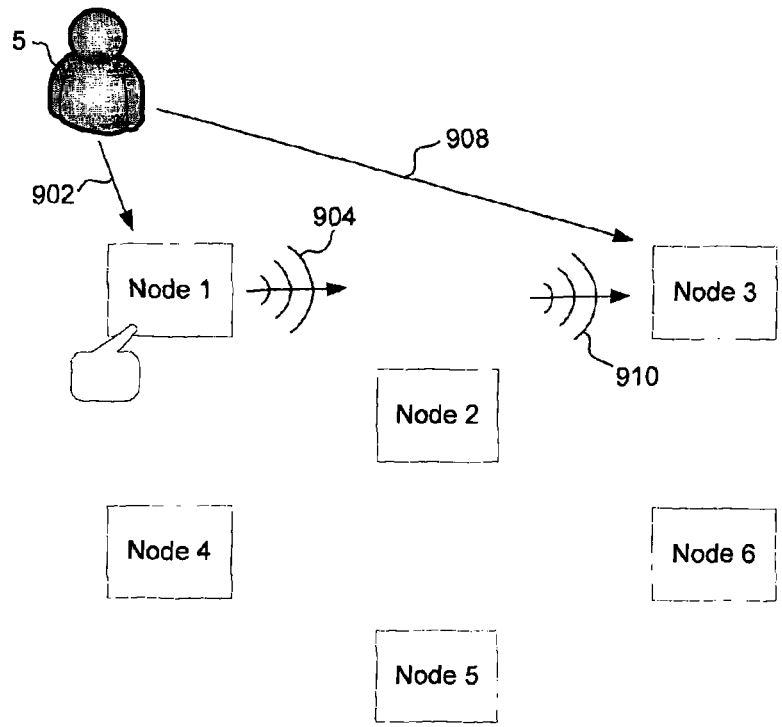
FIG. 22 is a schematic view of an example of a user triggered node collaboration using the multi-layer locator packet functionality.

Referring to FIG. 22, there is shown an example of a user triggered node collaboration using the multi-layer locator packet 218 (see FIG. 7) functionality.

A user 5 triggers 902 the locator packet broadcast on Node 1, for example by shortly pressing a multi-use button on the device associated with Node 1. Pressing shortly the multi-use button a second time may be used, for example, to stop the broadcast.

Node 1 then starts localization yelling 904 until the localization yelling period expires.

The user 5 then triggers 908 the locator packet on Node 3 within the localization yelling period of Node 1. Since Node 3 is currently receiving 910 the locator packet from Node 1, collaboration is initiated between Node 1 and Node 3 on the basis of their respective FNIDs. Both Node 1 and Node 3 keep localization yelling as long as collaboration is not successful. If collaboration fails, Node 1 and Node 3 simply stop yelling after the expiration of their respective localization period.

Upon the establishment of a successful collaboration between Node 1 and Node 3, both nodes start collaboration yelling until the collaboration yelling period expires to indicate that collaboration was established successfully.

ComLayer Setting Exchange within Collaboration Establishment

Figure 23:
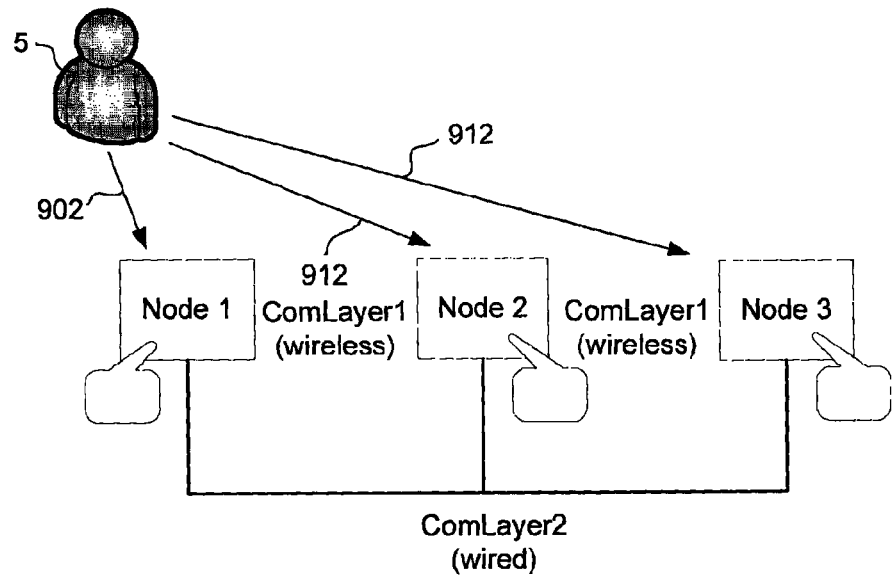
FIG. 23 is a schematic view of an example of a user triggered node collaboration between a wireless protocol ComLayer and a wired protocol ComLayer using the multi-layer locator packet functionality.

Referring to FIG. 23, there is shown an example of a user triggered node collaboration between a wireless protocol ComLayer and a wired protocol ComLayer using the multi-layer locator packet 218 (see FIG. 7) functionality, namely the exchange of ZigBee network parameter (wireless ComLayer1) over a wired link (wired ComLayer2). This allows a wireless network configuration and security information to be exchanged over a wired secure link In the illustrated example, the following will be assumed:
Node 1 support a ZigBee wireless protocol ComLayer (ComLayer1) and possess a full ZigBee configuration set, i.e. PanID, Security Key, etc.; and
Nodes 2 and 3 support a ZigBee wireless protocol ComLayer (ComLayer1) but have all ZigBee parameters set to default, i.e. different then the ZigBee configuration of Node 1.

A user 5 triggers 902 the locator packet broadcast on Node 1, for example by shortly pressing a multi-use button on the device associated with Node 1. Pressing shortly the multi-use button a second time may be used, for example, to stop the broadcast.

The user 5 then triggers 912 the locator packet broadcast on Nodes 2 and 3 within the localization period of Node 1 by shortly pressing Multi-use button. Since Nodes 2 and 3 are currently receiving the locator packet from Node 1, collaboration is initiated between Nodes 1, 2 and 3 on the basis of their respective FNIDs. Nodes 2 and 3 keep localization yelling as long as collaboration is not successful. If collaboration fails, Node 1 and Node 3 simply stop yelling after the expiration of their respective localization period.

Collaboration information is exchanged over the wired protocol ComLayer2 (for example the CANbus protocol) between Nodes 1, 2 and 3. Node 1 take the position of the ZigBee (i.e. wireless protocol ComLayer1) parameter server since it was the first node to be triggered. Nodes 2 and 3 detect this condition and retrieve their new parameters over wired protocol ComLayer2. At the end of the process, Nodes 1, 2 and 3 possess the same ZigBee network configuration.

Upon the establishment of a successful collaboration between Nodes 1, 2 and 3, all nodes start collaboration yelling until the collaboration yelling period expires to indicate that collaboration was established successfully.

Pod Triggered Node Localization

Figure 24:
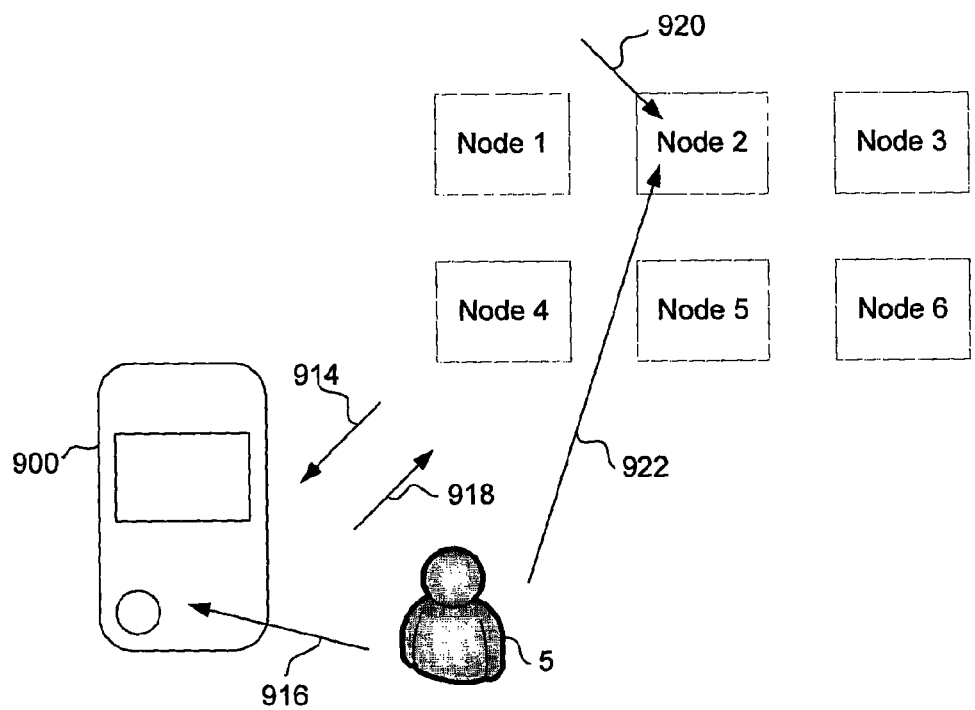
FIG. 24 is a schematic view of an example of a pod triggered node localization using the multi-layer locator packet functionality

Referring to FIG. 24, there is shown an example of a pod triggered node localization using the multi-layer locator packet 218 (see FIG. 7) functionality.

A pod 900 first builds a network map from available ComLayer information 914. A user 5 then uses 916 the pod 900 to send 918 a localization yelling command to Node 2 which, when it receives 920 the localization yelling command, starts localization yelling and thus broadcast its locator packet.

The user 5 is then able to visually locate Node 2 and make it stop 922 localization yelling by shortly pressing a multi-use button on the device associated with Node 2.

The localization packet presence or absence can then be used for network fault localization or debugging purposes.

Although the present invention has been described by way of particular embodiments and examples thereof, it should be noted that it will be apparent to persons skilled in the art that modifications may be applied to the present particular embodiment without departing from the scope of the present invention.

The invention claimed is:

1. A method for auto-configuring a multi-layer network comprising:
   providing each node with an information packet broadcasting a data packet including information about the node broadcasting the data packet;
   identifying nodes connected to nodes on at least a first layer and a second layer of the network as virtualizer nodes; and
   for each virtualizer node:
   virtualizing nodes on a particular layer onto another layer; and
   building a node registry comprising data extracted from data packets received at the virtualizer node from at least one other node in the network.

2. The method of claim 1, wherein the information packet comprises at least one of:
   a unique identifier;
   a function identifier;
   a link quality; and
   a time to live counter.

3. The method of claim 1, wherein the data packet comprises at least one of:
   an indicator that the packet is a data packet;
   an identifier indicating that the node is of a particular layer; and
   an information packet comprising data about the node broadcasting the data packet.

4. The method of claim 1, wherein an entry in the node registry comprises at least one of:

a unique identifier of the node from which the data packet was broadcasted; and
an identifier indicating that the node from which the data packet was broadcasted is of a particular layer.

5. The method of claim 1, farther comprising:
removing a node entry from the node registry if a data packet has not been received the node within a specified time period.

6. The method of claim 1, wherein a source node selects a layer to communicate with a destination node based on the source node registry.

7. A method for dynamic discovery of nodes in a network, comprising:
sending via a first node in a network a data packet to a second node in the network, the data packet including at least one of: an indicator that the data packet is for dynamically updating the node registry, a communication layer identifier for the first node, and/or a node information packet for the first node, the node information packet having at least one of: a unique node identifier for the first node, a functional identifier for the first node indicating an application to which the node is assigned and a function within the application to which the node is assigned, a Multi-Layer Link Quality (MLQ) value for the first node, and a Multi-Layer Virtualization Potential (MLVP) value for the first node;
receiving via the second node the data packet;
dynamically updating a node registry configured by the second node to indicate the presence of the first node;
removing a node entry associated with the first node from the node registry if a subsequent data packet is not received from the first node within a specified time period;
receiving a request for the node registry; and
outputting the node registry to a source of the request.

8. The method of claim 7, wherein the data packet further includes:
a time interval on which the packet will be sent.

9. The method of claim 7, wherein the MLQ value indicates the strength of a connection between the first node and the second node.

10. The method of claim 7, wherein the MLVP value indicates the number of times the first node may be virtualized on a communication layer.

11. The method of claim 7, wherein the node registry comprises:
a map of each node which has sent a data packet to the second node, the map comprising:
at least one node represented by node data comprising at least one of:
the unique node identifier, and
the communication layer identifier.

12. The method of claim 11, wherein the node data further comprises at least one of:
a time interval on which a packet will be sent from the first node;
the MLQ value; and
the MLVP value.

13. The method of claim 7, wherein the first node also generates and updates a node registry based on a data packet received from at least a third node.

14. The method of claim 7, wherein a source node selects a layer to communicate with a destination node based on the source node registry.

15. A method for dynamic discovery of nodes in a network, comprising:
sending via a first node in a network and on a first communication layer, a data packet configured with a first communication layer format, to a second node in the network on a second communication layer;
receiving via the second node on the second communication layer the data packet configured with the first communication layer format;
generating a virtual node on the second communication layer, the virtual node comprising data extracted from the data packet received from the first node;
sending via the virtual node on the second communication layer a data packet configured with a second communication layer format, to the second node on the second communication layer;
receiving Via the second node on the second communication layer the data packet configured with the second communication layer format;
dynamically updating a node registry configured by the second node to indicate the presence of the virtual node;
receiving a request for the node registry; and
outputting the node registry to the source of the request.

16. The method of claim 15, wherein the first communication layer and the second communication layer is each one of a different wired or wireless communication link or sub-network.

17. The method of claim 15, wherein the virtual node is not generated if a Multi-Layer Virtualization Potential (MLVP) value for the first node is less than a pre-determined threshold.

18. The method of claim 15, further comprising:
sending via the second node on the second communication layer, a data packet configured with the second communication layer format, to at least a third node in the network on at least a third communication layer;
receiving via the at least a third node on the at least a third communication layer the data packet configured with the second communication layer format;
generating at least one subsequent virtual node on the at least a third communication layer, the at least one subsequent virtual node comprising data extracted from the data packet received from the second node; and
sending via the at least one subsequent virtual node on the at least a third communication layer a data packet configured with an at least a third communication layer format, to the at least a third node on the at least a third communication layer.

19. The method of claim 15, further comprising:
removing a node entry from the node registry if a data packet has not been received from the node within a specified time period.

20. The method of claim 15, wherein a source node selects a layer to communicate with a destination node based on the source node registry.

21. A method for dynamic discovery of nodes in a network, comprising:
sending via a first node in a network a data packet to a second node in the network;
receiving via the second node the data packet;
dynamically updating a node registry configured by the second node to indicate the presence of the first node;
extracting a functional identifier for the first node from the data packet;
comparing the functional identifier for the first node to a record of unclaimed functional identifiers;
updating the record of unclaimed functional identifiers if the functional identifier for the first node matches a functional identifier in the record;

updating the functional identifier of the second node based on the updated record of unclaimed functional identifiers;
receiving a request for the node registry; and
outputting the node registry to the source of the request.

22. The method of claim 21, wherein the functional identifier indicates an application to which the node is assigned, and a function within the application to which the node is assigned.

23. The method of claim 22, wherein the application is a role for a plurality of nodes to fill.

24. The method of claim 23, wherein the application is Room Temperature Control.

25. The method of claim 22, wherein the function is a role for a particular node to fill.

26. The method of claim 25, wherein the function is one of a temperature sensor and a heat controller.

27. The method of claim 23, wherein updating the functional identifier of the second node comprises choosing an application and function pairing which has not been claimed by a previous node.

28. The method of claim 22, wherein the network comprises more than one application.

29. The method of claim 28, wherein the second node may choose a second application, the second application being different from the application assigned to the first node, if all of the functions in the application assigned to the first node have been claimed.

30. The method of claim 21, further comprising:
sending from the second node a data packet to at least one subsequent node;
wherein the data packet from the second node indicates the updated functional identifier of the second node;
receiving the data packet at the at least one subsequent node;
extracting the updated functional identifier for the second node from the data packet;
comparing the updated functional identifier the record of unclaimed functional identifiers;
updating the record of unclaimed functional identifiers to indicate the functional identifier from the second node has been claimed;
updating the functional identifier of the at least one subsequent node based on the updated record of unclaimed functional identifiers; and
sending a data packet to further subsequent nodes;
wherein the data packet from the at least one subsequent node indicates the updated functional identifier of the at least one subsequent node.

31. The method of claim 21, further comprising:
removing a node entry from the node registry if a data packet has not been received from the node within a specified time period.

32. The method of claim 21, wherein a source node selects a layer to communicate with a destination node based on the source node registry.

33. A method for dynamic discovery of nodes in a network, comprising:
sending via a first node in a network a data packet to a second node in the network, the data packet including at least one of: an indicator that the data packet is for dynamically updating the node registry, a communication layer identifier for the first node, and a node information packet for the first node, the node information packet having at least one of: a unique node identifier for the first node, a functional identifier for the first node, a Multi-Layer Link Quality (MLQ) value for the first node, and a Multi-Layer Virtualization Potential (MLVP) value for the first node indicating the number of times the first node may be virtualized on a communication layer;
receiving via the second node the data packet;
dynamically updating a node registry configured by the second node to indicate the presence of the first node;
receiving a request for the node registry; and
outputting the node registry to a source of the request;
wherein a source node selects a layer to communicate with a destination node based on the source node registry.

34. The method of claim 33, wherein the data packet further includes:
a time interval on which the packet will be sent.

35. The method of claim 33, wherein the functional identifier indicates an application to which the node is assigned, and a function within the application to which the node is assigned.

36. The method of claim 33, wherein the MLQ value indicates the strength of a connection between the first node and the second node.

37. The method of claim 33, wherein the node registry comprises:
a map of each node which has sent a data packet to the second node, the map comprising:
at least one node represented by node data including at least one of:
the unique node identifier, and
the communication layer identifier.

38. The method of claim 37, wherein the node data further comprises at least one of:
a time interval on which a packet will be sent;
the MLQ value; and
the MLVP value.

39. The method of claim 33, wherein the first node also generates and updates a node registry based on a data packet received from at least a third node.

40. The method of claim 33, further comprising:
removing a node entry associated with the first node from the node registry if a subsequent data packet is not received from the first node within a specified time period.

\* \* \* \* \*